W. H. PAYNE.
CLASP FOR GARMENTS, CORSETS, &c.
No. 11,482. Reissued Mar. 26, 1895.
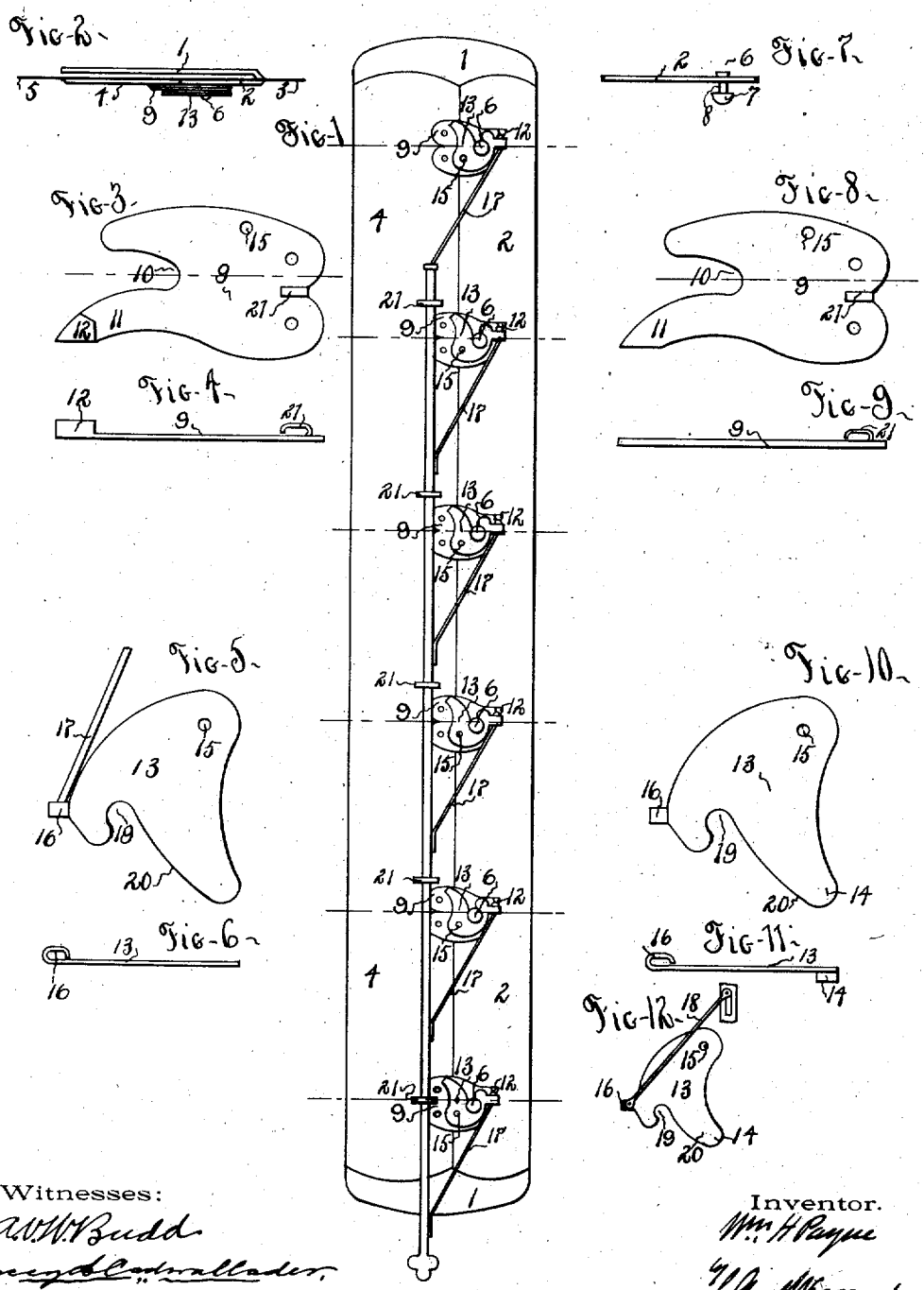
Witnesses:
A. W. Budd
Inventor.
Wm. H. Payne
Attorney.

UNITED STATES PATENT OFFICE.

WILLIAM H. PAYNE, OF CAMDEN, NEW JERSEY, ASSIGNOR TO GEORGE W. BLACKBURN, OF SAME PLACE, AND ZACHARIAH K. LOUCKS, JR., OF PHILADELPHIA, PENNSYLVANIA.

CLASP FOR GARMENTS, CORSETS, &c.

SPECIFICATION forming part of Reissued Letters Patent No. 11,482, dated March 26, 1895.

Original No. 533,230, dated January 29, 1895. Application for reissue filed February 23, 1895. Serial No. 539,515.

*To all whom it may concern:*

Be it known that I, WILLIAM H. PAYNE, a citizen of the United States, residing at Camden, in the county of Camden and State of New Jersey, have invented certain new and useful Improvements in Clasps for Garments, Corsets, or Like Articles; and I do hereby declare the following to be a sufficiently full, clear, and exact description thereof as to enable others skilled in the art to make and use the said invention.

This invention relates to clasps for garments and similar articles, and is specially applicable to corsets, but is useful as well for gaiter and glove clasps, and for surgical appliances, requiring to be opened and closed to apply them to the person of the wearer, and has for its object the better facility and security of clasping, and easier unclasping and the avoidance of springing and twisting of the clasp plates, and consequent breaking of such parts, incident to fastening and releasing clasps of the usual construction.

To this end this invention consists of a series of studs fastened upon one plate of the clasp, a series of open forked plates fastened on the opposite plate of the clasp, in position to engage the necks of the several studs, and a hook pivotally attached to each fork, arranged to engage and hold the neck of the stud in the fork, and a projecting finger on the hook arranged to expel the stud from the fork when unhooked and stops to limit the motion of the hooks, and a cord or an equivalent connecting mechanism, arranged to simultaneously release all of the hooks, and expel the studs from the forks, but to permit the several forks and hooks to be separately engaged with the studs.

The construction and operation of this invention are hereinafter fully described and shown in the accompanying drawings.

Referring to the drawings, Figure 1 shows a front view of a corset clasp embodying this invention; Fig. 2, a top or end view thereof; Figs. 3 and 4, respectively, front and edge views of one of the forked plates thereof; Figs. 5 and 6, like views of one of the hooks; Fig. 7, one of the studs and part of the plate in which it is fastened. Figs. 8 and 9 are respectively front and edge views of a modified form of the forks. Figs. 10 and 11 are respectively front and edge views of a modified form of one of the hooks. Fig. 12 is a front view of a modified form of one of the hooks, with a link connected therewith to unfasten it.

Referring to Figs. 1 and 2, 1 indicates the broad spring plate of a corset clasp; 2, the narrow plate secured thereto by the cloth forming one end or side of the corset; 4, the narrow plate secured to the cloth 5 forming the other end or side of the corset.

6, 6, 6, are studs secured in the plate 2, having heads 7 and necks 8 projecting in front of the plate 2 through the cloth 3.

To the plate 4 plates 9 are attached so as to project beyond the edge thereof through the cloth 5. In the projecting end of each plate 9 a converging notch 10 is formed of such size as to easily fit the neck 8 of the stud 6, with the head 7 in front of the plate 9, the notched plate 9 thus forming a fork which readily receives the neck 8 of the stud 6 when introduced in the direction of the line of stress of the clasp. A hook 13 is secured to the plate 9 by a pivot 15 below the central line of the notch 10 if extended as shown in horizontal dotted line in the drawings in Figs. 1, 3 and 8. An eye 16 is formed on the hook 13 to which a cord 17 is attached for the purpose of releasing the stud 6 from the hook 13. In Fig. 12 a link 18 is shown pivotally attached to it for the same purpose.

The cord 17 is guided by eyes 21 projecting through the cloth 5 and may be either formed integrally with the plates 9 forming the fork, or made separately and attached to the cloth 5.

The notch 19 of the hook 13 is of such size as to fit the neck 8 of the stud 6. The portion of the hook 13, marked 20, is relatively to the location of its pivotal point 15 of an involute curved form and in fastening the clasp operates as a lever, receiving motion from the stud 6 when pressed into the notch 10 of the plate 9 and closes the hook 13 with the notch 19 around the neck 8 of the stud 6. The internal concave curve of the hook is concentric with the arc of its motion on the pivot 15 so that any stress applied to the plate 2 of the clasp is inoperative to produce motion of the hooks 13 to release them from the studs 6. As a consequence the clasp hooks automatically by simply closing it with a motion in the direct line of the stress and is incapable of unfastening by stress upon the plates 2 and 4 but can easily be released by motion imparted directly to the hooks. When the cord 17 is drawn the hooks 13 turn on their pivots 15, and disengage the notches 19 from the necks 8 of the studs 6. The curved portion 20 of the hooks 13 then act as cams or levers to expel the studs 6 from the notches 10 in the plates 9.

The opening motion of the hooks 13 on their pivots 15 is limited by a projection marked 12 formed on the lower prong 11 of the plate 9 (as shown in Figs. 3 and 4) meeting the end of the lever 20 of the hook 13, so that after disengagement, the hooks 13 are in proper position for re-engaging the studs 6 for the next closing operation. A modified form of parts for limiting the opening motion of the hooks is shown in Figs. 8, 9, 10 and 11, in which a projection marked 14 on the lever 20 of the hook 13 meets the long prong 11 of the plate 9. The long prongs 11 on the plates 9 facilitate the guidance of the studs 6 toward the notches 10 in the plates 9 inclosing the clasp.

I am aware that garment clasps having studs upon one member engaging in key hole shaped slits with open ends in the other member have been combined with hooks whereby they could be liberated after they had been engaged through the larger or circular ends of the slits; also that notched plates forming hooks with lateral and rearwardly inclined openings have been combined with hooks by which they could be held therein or liberated therefrom. Such clasps require in fastening a motion crosswise to the direction of stress in fastening and releasing them and a greater stress in closing and releasing them than when closed, and are therefore inconvenient to fasten; also that fastenings having parallel sided notches without converging guides have been combined with retaining hooks. These are inconvenient to fasten and none of these do I claim, but, Having described my invention and the operation thereof, what I claim is—

1. In a garment clasp, two plates forming opposite members of such clasp, a series of plates 9 attached to one member each having a converging notch 10 therein open in the direction of the stress of said clasp, a series of studs 6 attached to the opposite member each stud so located as to enter one of said notches 10, in combination with hooks 13 each pivotally attached to a plate 9 and having a notch 19 a lever arm 20 and a stop for restricting motion and a cord for simultaneously liberating said hooks all constructed and arranged to operate as described and shown for the purpose set forth.

2. In a garment fastening a stud 6 adapted to be fastened to one end of a garment, in combination with the plate 9 adapted to be fastened to the opposite end of such garment and having a converging notch 10 in the outer end thereof, a hook 13 having a notch 19 and lever arm 20 and a pivot 15 located in and uniting said plate 9 and hook 13 as shown and described all arranged to operate as set forth.

WILLIAM H. PAYNE.

Witnesses:
C. R. MORGAN,
LACEY L. CADWALLADER.